Figure 1:
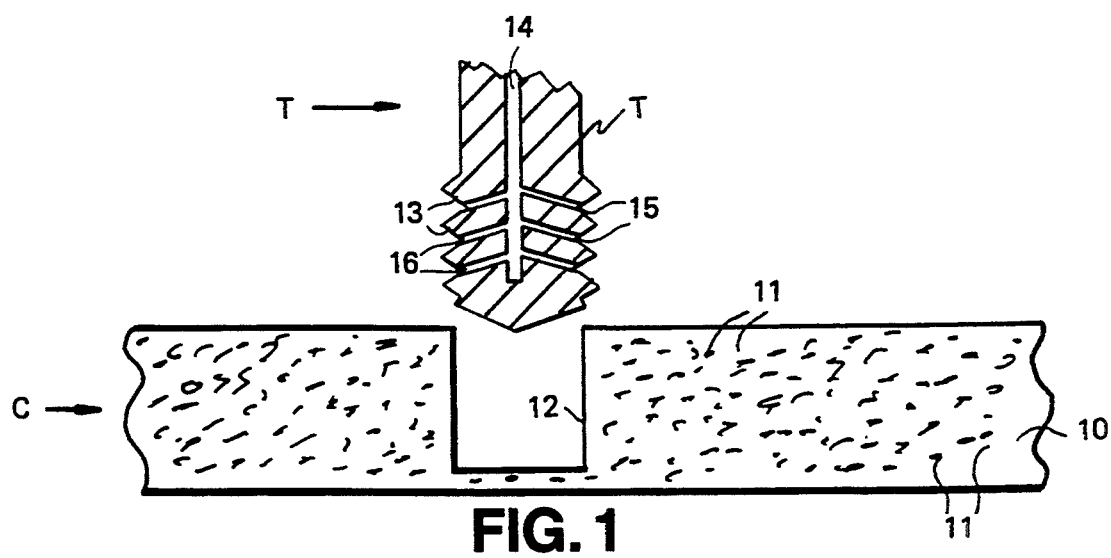

United States Patent [19]

Murphy

[11] Patent Number: 5,435,786
[45] Date of Patent: Jul. 25, 1995

[54] METHOD OF MAKING A COMPONENT WITH A THREADED HOLE

[76] Inventor: Martin J. M. Murphy, Lane Edge Cottage, Hoggeston Near Winslow, Buckinghamshire MK18 3LL, Great Britain

[21] Appl. No.: 29,486

[22] Filed: Mar. 11, 1993

[30] Foreign Application Priority Data

Sep. 14, 1990 [GB] United Kingdom ............... 9020223
Jul. 19, 1991 [GB] United Kingdom ............... 9115662

[51] Int. Cl.6 ................................................ B23G 7/00
[52] U.S. Cl. ..................................................... 470/25
[58] Field of Search ................ 470/18, 25, 198, 200, 470/204

[56] References Cited

U.S. PATENT DOCUMENTS 2,807,813 10/1957 Welles, Jr. ........................ 10/152
4,693,646 9/1987 Andrews ............................ 409/136

FOREIGN PATENT DOCUMENTS 1527200 7/1971 Germany.
3307555 7/1985 Germany.
8901178 3/1989 Germany.
0281819 11/1989 Japan ................................. 470/198
0100820 4/1990 Japan ................................. 470/198
8806933 9/1988 WIPO.

*Primary Examiner*—Lowell A. Larson
*Assistant Examiner*—Thomas C. Schoeffler
*Attorney, Agent, or Firm*—Caesar, Rivise, Bernstein, Cohen & Pokotilow, Ltd.

[57] ABSTRACT

A method of making a threaded hole in a component includes the steps of inserting into a preformed hole a cold forming tool comprising spaced apart threaded forming rings, a main passage for the passage of fluid extending through the tool, and branch passages leading from the main passage to outlets between adjacent thread forming rings, and directing pressure resistant lubricant fluid to flow under pressure through the passages to the outlets between adjacent rings into a gap between the tool and the wall of the hole to be threaded to cause the threads to be formed by displacement and deformation of the component material by the pressurized fluid.

11 Claims, 1 Drawing Sheet

METHOD OF MAKING A COMPONENT WITH A THREADED HOLE

This application is a continuation of international application PCT/GB91/01576, filed Sep. 13, 1991.

The invention relates to the threading of a hole in a component made of a material in which it is difficult to form an internal thread in the wall of the hole by known methods. Such materials include so-called metal matrix composites, which consist of a continuous metal phase reinforced with a disperse phase which may or may not be metal. The continuous phase may be formed of a metal such as aluminium, magnesium, titanium or an alloy based on any of these; the disperse phase may be in particulate, fibre or whisker form and selected from a wide range of materials such as silicon carbide, boron carbide, alumina, carbon, sand and other refractory fillers; wires of steel, copper or silver; and the like. A typical metal matrix composite comprises from about 10% to 40% by volume of silicon carbide in a continuous phase of an alloy of aluminium/magnesium/silicon or aluminium/copper or aluminium/lithium. Composites are of value because of lightness in weight coupled with strength and stiffness properties which are exerted even at high temperatures. Such composites can be made by a wide variety of techniques. The component may be a part useful in the automotive or aerospace, aeronautical or construction industries. Other materials in which it is difficult to form threaded holes include so-called aggressive metals which present a resistance to being worked, e.g. ductile steels, titanium, and the like, and non-metallic compositions such as particle boards, fibre based or reinforced materials.

It is one object of this invention to provide a method of making a threaded hole in a component made of a material in which it is otherwise difficult to form a threaded hole by known method. The invention is based on the discovery that a cold forming tool such as a tap can be used to form the threads. This appears to be possible because under the conditions of this invention the distribution of the disperse phase allows the tap to displace the more ductile continuous phase so allowing thread forming parts of the tool readily to form the required threads.

According to the invention in one aspect there is provided a method of threading the wall of a hole in a component composed of relatively ductile material, the method comprising urging a cold forming tool having thread-forming means into the hole characterised by supplying pressure resistant lubricant fluid, thereby to form the threaded wall.

Preferably, the cold forming tool has spaced apart thread forming rings and the pressure resistant lubricant fluid is directed to flow under pressure between adjacent rings into the gap between the tool and the wall to be threaded. The fluid may be introduced intermittently or continuously, as required. In a preferred feature, the tool has a main passage for the passage of the fluid, branch passages leading from the main passage to outlets at the junction of adjacent rings. Many proposals exist in the literature to cut threads in metal, see e.g. U.S. Pat. No. 4,693,646 and DE-A-3307555 and DE-UM-A-G89 01178, and to provide a bore so that a lubricant and/or coolant liquid may flow therethrough. These disclosures are not relevant to this invention where the tool operates by displacing metal and not cutting it, i.e. there is no swarf. Such thread cutting devices cannot be used with the ductile or aggressive materials of which the components relevant to this invention are formed. It is also proposed in U.S. Pat. No. 2,807,813 to use a fluteless tap to form internal threads in a borehole in a ductile material but no liquid is present when that device is used. In contrast, in the present invention, a tap is used in association with the pressure-resistant liquid to form the desired threads in a particularly efficient and advantageous way.

The tool is preferably made of a high speed steel, e.g. cobalt steel, the use of which in the context is considered to be totally unexpected.

The lubricant fluid, which may be a liquid or gas, is preferably supplied at relatively high pressure (say 1200 psi) and a relatively low flow rate. The fluid is preferably also temperature resistant and is most preferably an extreme pressure resistant lubricant such as a gearbox oil.

The tool may be advanced into a preformed hole with rotation and/or by a rectilinear motion.

Our investigations have established that where the continuous phase of a metal matrix composite is a ductile material, e.g. aluminium, the regions of component which are free of the disperse phase still have that ductility despite the presence of the dispersed hard or refractory particles in the matrix. When a thread forming tool of the invention is urged into the hole, the continuous phase being ductile yields under the insertion force, allowing the threads to be formed in the hole wall accurately and efficiently. The urging is done cold by rotating the tap or by rectilinear motion. No material is cut away, so there is no swarf etc. to be removed. There is some evidence to suggest that the wall portions defining the formed threads have a high concentration of the hard particles, which may provide increased strength and wear resistance.

The fluid is required because if fluid is not present the tool is subjected to severe wear and will usually last for a single use only. The volume of fluid required is very low, which implies that only a thin film of material is formed between the wall to be threaded and the thread former, which film must have lubricous and pressure resistant properties.

In other aspects, the invention includes a component having a hole therein, the wall of the hole being threaded, the threads having been formed in the wall of a preformed hole by the urging therein of a cold forming tool having thread-forming means; and a cold forming tool comprising a shank having spaced apart thread forming rings, means being provided to supply pressure resistant lubricant fluid to outlets adjacent and/or between the rings.

Figure 2:
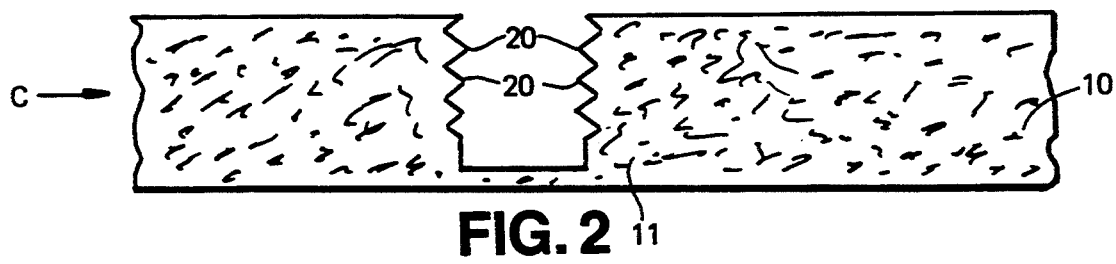

In order that the invention may be well understood it will now be described by way of example only with reference to the accompanying diagrammatic drawings, in which:

FIG. 1 is a section of a component having a hole with generally smooth walls showing the thread forming tap, and FIG. 2 is a section of the threaded hole.

The component C comprises a body 10 formed of a metal matrix composite such as a ductile aluminium/magnesium/silicon alloy containing hard particles of silicon carbide 11 dispersed therein. A hole 12 having straight side walls is formed, e.g. by punching, drilling or the like into the depth of the body 10. A cold forming tool T in the form of a tap has thread former rings 13 which are spaced apart longitudinal of the shank. A passage 14 extends through the shank and the branch passages 15 which open at the outlets 16 at the junction, i.e. roots of adjacent rings 13. A lubricant which is pressure and temperature resistant, e.g. a gearbox oil, is passed through the outlets 16 at relatively high pressure but low flow rate to be interposed between the walls of the hole 12 and the tool T. The rings are dimensioned according to the size of threads to be formed. The tap T is then urged into the hole 12 using known equipment and then removed. The insertion cause the particles of the silicon carbide to be displaced away from the hole wall because of the ductility of the continuous phase of the metal matrix composite. The hole has thereby been threaded at 20 by the rings 13 and the body retains its properties of lightness in weight, strength, stiffness and the like. It is surprising that a metal matrix composite can undergo deformation during the tapping leading to the formation of threads without any adverse effect. There is evidence that the particles are concentrated in the formed threads 20. The fluid appears to act lubriciously to allow the tool to move relative to the hole wall and to provide a boundary layer to reduce tool wear. The fluid may however play a more direct role in shaping the thread as there is evidence to suggest that the fluid on the tap contours presents a mould surface which deforms the wall of the hole.

The invention is not limited to the embodiment shown. The tool may be fluted to allow for escape of fluid; the fluid may be introduced in other ways; the fluid may be a gas such as nitrogen; the component may be made of metal or non-metal. The hole may be blind or a through hole.

I claim:

1. A method of forming threads in the wall of a preformed hole in a component composed of a metal matrix composite, the method comprising the steps of inserting into the preformed hole a cold forming tool comprising:
   (a) spaced apart thread forming rings;
   (b) a main passage for the passage of fluid extending through the tool; and
   (c) branch passages leading from the main passage to outlets between adjacent thread forming rings;
and directing pressure resistant lubricant fluid to flow under pressure through the passages to the outlets between adjacent rings into a gap between the tool and the wall of the hole to be threaded to cause the threads to be formed by displacement and deformation of the metal matrix composite by the pressurized fluid.

2. The method of claim 1 additionally comprising the step of supplying the fluid under a pressure of about 1200 psi.

3. The method of claim 1 additionally comprising the step of selecting the fluid supplied under pressure to also be temperature resistant.

4. The method of claim 1 additionally comprising the step of selecting the fluid to be an extreme pressure resistant lubricant.

5. The method of claim 4 additionally comprising the step of selecting the fluid to be gear box oil.

6. The method of claim 1 wherein the component having the preformed hole is selected to be a metal matrix composite comprising aluminum as a continuous phase of the matrix, and particles of silicon carbon are dispersed therein.

7. A method of forming threads in the wall of a preformed hole in a component composed of steel, the method comprising the steps of inserting into the preformed hole a cold forming tool comprising:
   (a) spaced apart thread forming rings;
   (b) a main passage for the passage of fluid extending through the tool; and
   (c) branch passages leading from the main passage to outlets between of adjacent thread forming rings;
and directing pressure resistant lubricant fluid to flow under pressure through the passages and the outlets between adjacent rings into a gap between the tool and the wall of the hole to be threaded to cause the threads to be formed by displacement and deformation of the steel by the pressurized fluid.

8. A method of forming threads in the wall of a preformed hole in a component composed of particle board, the method comprising the steps of inserting a cold forming tool comprising:
   (a) spaced apart thread forming rings;
   (b) a main passage for the passage of fluid extending through the tool and
   (c) branch passages leading from the main passage to outlets between adjacent thread forming rings;
and directing pressure resistant lubricant fluid to flow under pressure through the passages and the outlets between adjacent rings into a gap between the tool and the wall of the hole to be threaded to cause the threads to be formed by displacement and deformation of the particle by the pressurized fluid.

9. A method of forming threads in the wall of a preformed hole in a component composed of a metal matrix composite, the method comprising the steps of inserting into the preformed hole a cold forming tool comprising:
   (a) spaced apart thread forming rings;
   (b) a main passage for the passage of the fluid extending through the tool; and
   (c) branch passages leading from the main passage to outlets between of adjacent thread forming rings;
and directing pressure resistant lubricant fluid to flow under pressure through the passages to the outlets between adjacent rings into a gap between the tool and the wall of the hole to be threaded to cause the threads to be formed by displacement and deformation of the metal matrix composite by the pressurized fluid and the tool.

10. A method of forming threads in the wall of a preformed hole in a component composed of steel, the method comprising the steps of inserting into the preformed hole a cold forming tool comprising:
   (a) spaced apart thread forming rings;
   (b) a main passage for the passage of fluid extending through the tool; and
   (c) branch passages leading from the main passage to outlets of adjacent thread forming rings;
and directing pressure resistant lubricant fluid to flow under pressure through the passages and the outlets between adjacent rings into a gap between the tool and the wall of the hole to be threaded to cause the threads to be formed by displacement and deformation of the steel by the pressurized fluid and the tool.

11. A method of forming threads in the wall of a preformed hole in a component composed of particle board, the method comprising the steps of inserting a cold forming tool comprising:
   (a) spaced apart thread forming rings;
   (b) a main passage for the passage of fluid extending through the tool and
   (c) branch passages leading from the main passage to outlets between adjacent thread forming rings;
and directing pressure resistant lubricant fluid to flow under pressure through the passages and the outlets between adjacent rings into a gap between the tool and the wall of the hole to be threaded to cause the threads to be formed by displacement and deformation of the particle board by the pressurized fluid and the tool.

* * * * *